May 5, 1964 R. C. ANGELL ETAL 3,131,883
HOSE RETRIEVING DEVICE
Filed Jan. 25, 1961 6 Sheets-Sheet 1
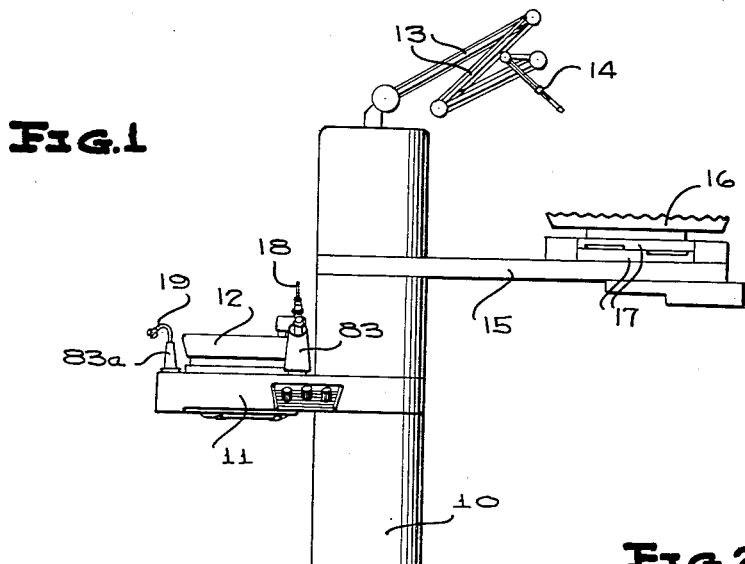
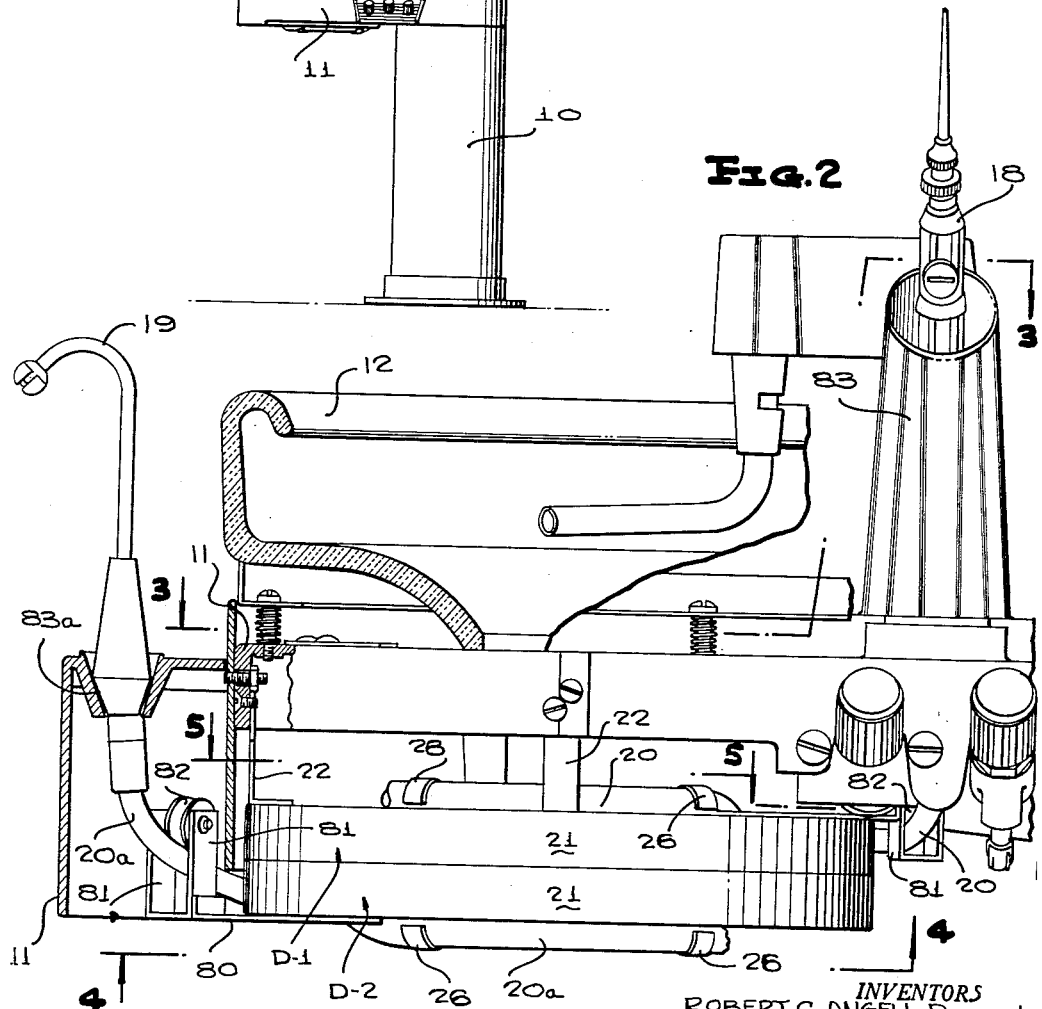
INVENTORS
ROBERT C. ANGELL, Deceased.
BY JAMES B. ANGELL, EXECUTOR.
ARMAND MASSEN
RUDOLPH VETERE
BY Mason, Porter, Diller & Stewart,
ATTORNEYS INVENTORS
ROBERT C. ANGELL, Deceased.
BY JAMES B. ANGELL, EXECUTOR.
ARMAND MASSEN
RUDOLPH VETERE

ATTORNEYS

May 5, 1964  R. C. ANGELL ETAL  3,131,883
HOSE RETRIEVING DEVICE
Filed Jan. 25, 1961  6 Sheets-Sheet 3
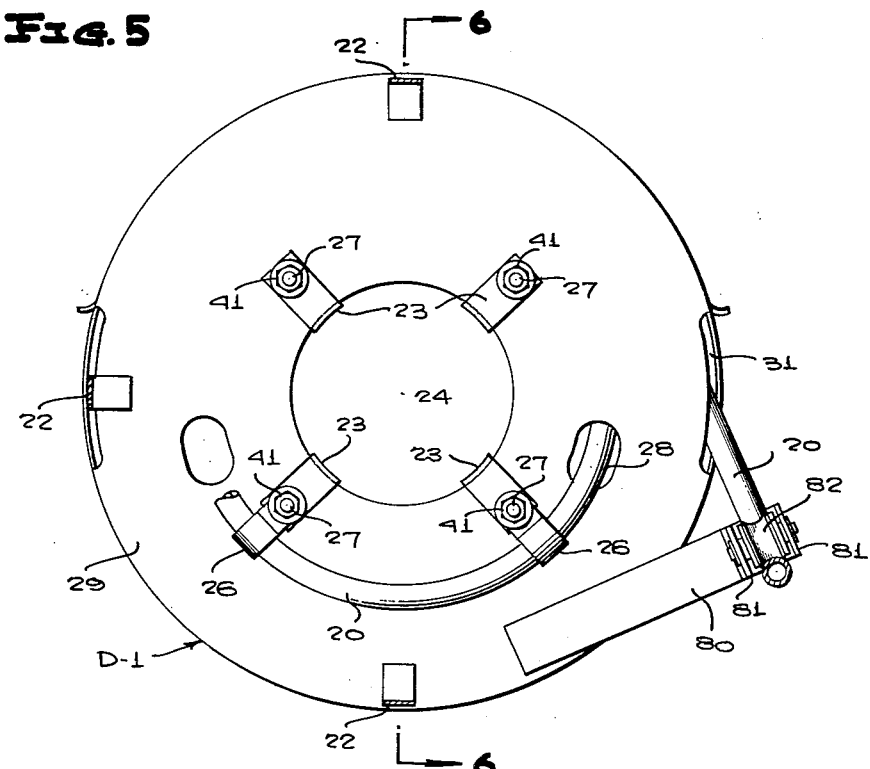
Fig. 5
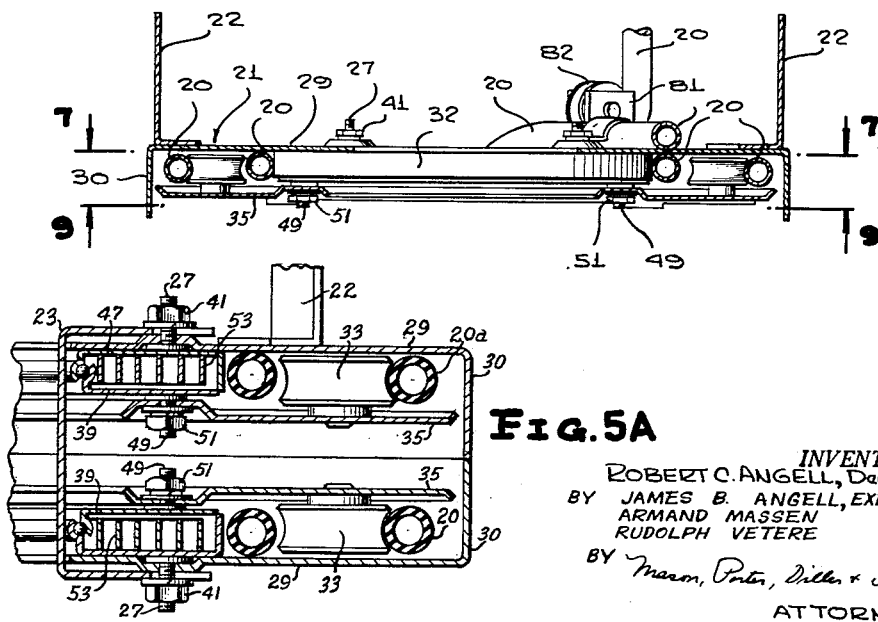
Fig. 6
Fig. 5A
INVENTORS
ROBERT C. ANGELL, Deceased.
BY JAMES B. ANGELL, EXECUTOR.
ARMAND MASSEN
RUDOLPH VETERE
BY Mason, Porter, Diller & Stewart,
ATTORNEYS May 5, 1964  R. C. ANGELL ETAL  3,131,883
HOSE RETRIEVING DEVICE
Filed Jan. 25, 1961  6 Sheets-Sheet 4
Fig.7
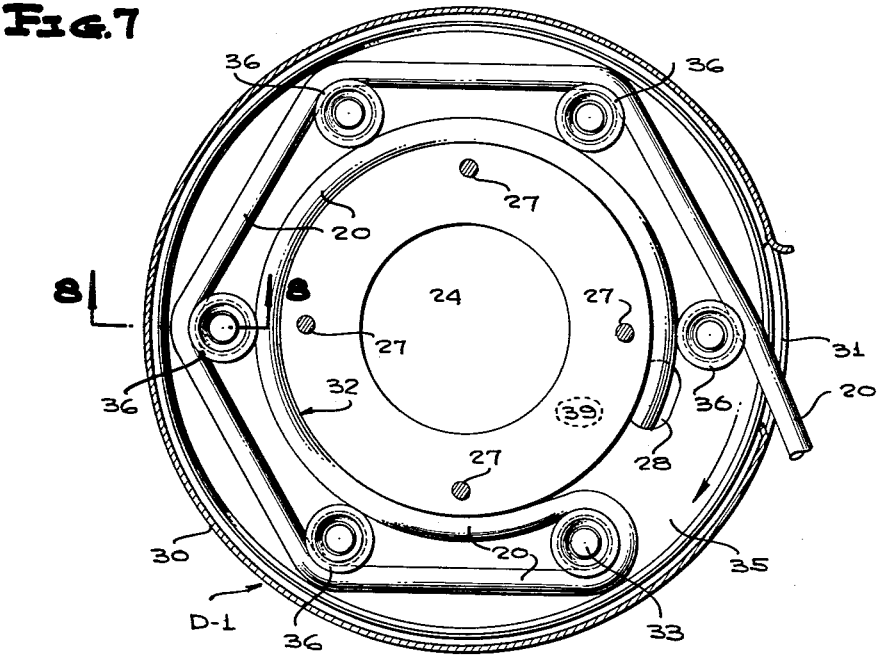
Fig.9
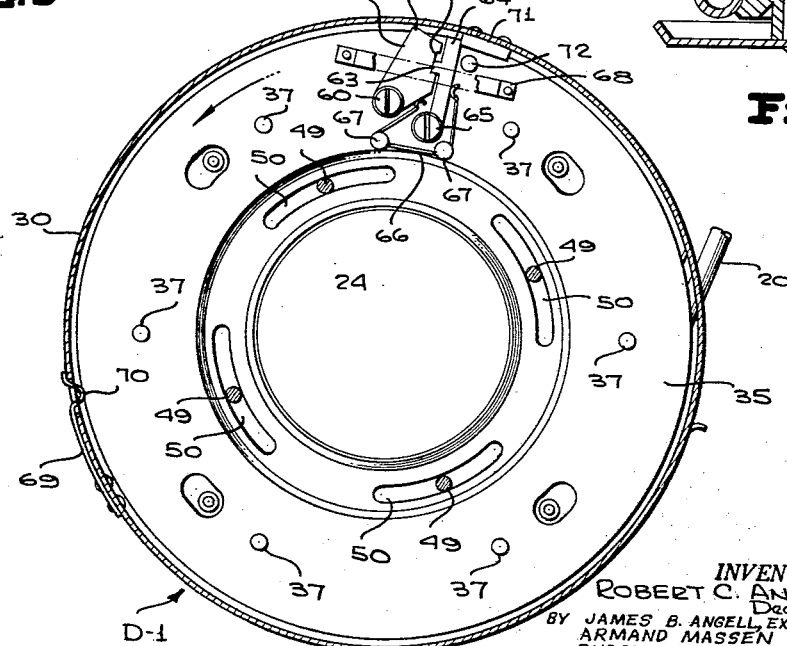
Fig.8
INVENTORS
ROBERT C. ANGELL, Deceased.
BY JAMES B. ANGELL, EXECUTOR.
ARMAND MASSEN
RUDOLPH VETERE
BY Mason, Porter, Diller & Stewart,
ATTORNEYS May 5, 1964 R. C. ANGELL ETAL 3,131,883
HOSE RETRIEVING DEVICE
Filed Jan. 25, 1961 6 Sheets-Sheet 6
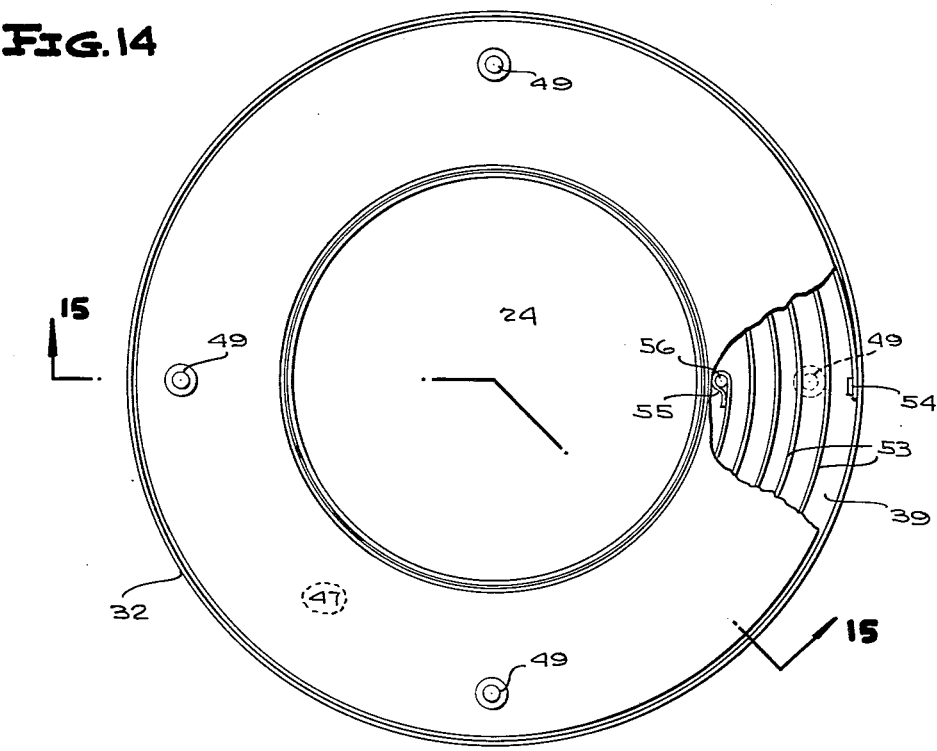
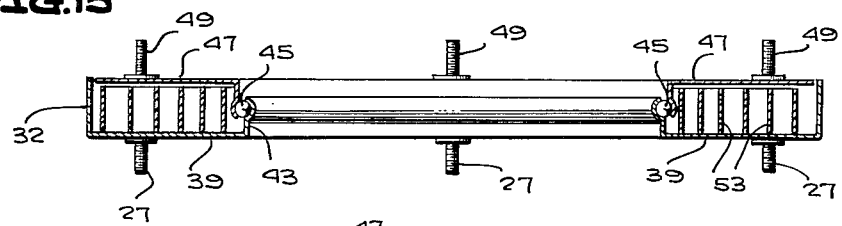
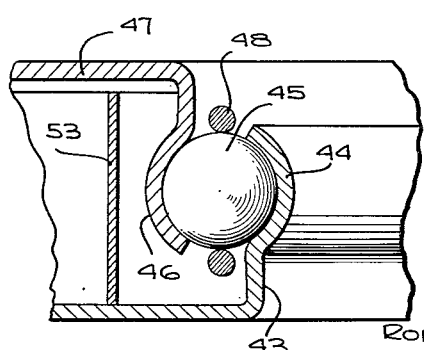
INVENTORS
ROBERT C. ANGELL, Deceased.
BY JAMES B. ANGELL, EXECUTOR.
ARMAND MASSEN
RUDOLPH VETERE
BY Mason, Porter, Diller, & Stewart,
ATTORNEYS

United States Patent Office 3,131,883
Patented May 5, 1964

3,131,883
HOSE RETRIEVING DEVICE
Robert C. Angell, deceased, late of Staten Island, N.Y., by James B. Angell, executor, Menlo Park, Calif., and Armand Massen and Rudolph Vetere, Staten Island, N.Y., assignors to The S. S. White Dental Manufacturing Company, Philadelphia, Pa., a corporation of Pennsylvania
Filed Jan. 25, 1961, Ser. No. 84,960
9 Claims. (Cl. 242—107.7)

This invention relates to automatic winding or retrieving devices for hose, cord, tape and other flexible elements herein termed "flexible linear articles": and is particularly of value for permitting withdrawal, holding and retrieving the hoses connected to service pieces employed by dentists.

In dental work, the dentist has occasion to employ jets of water, and to employ suction devices to remove liquid from the oral cavity, during the course of dental operations. The jet nozzle and the saliva ejector, so called, are removably connected at the ends of lengths of hose. When their use is not indicated, the dentist wants to have the hose and attachments out of the working region; but ready for quick employment. In preparing for use, the attachment is drawn forth, and the hose should advance with it for a distance determined by the denitst and by movements of the patient. When the attachment is to be returned after use, the hose should be capable of quick retrieval: but the retrieving devices should not act prematurely or accidentally to pull the attachment from its position of employment.

An object of this invention is to provide a retrieving device which can hold the flexible article ready for immediate use, which permits the delivery of the article when the same is pulled and with further delivery, if desired, and which effects a quick retrieving when the extended article is no longer needed.

Another object of the invention is the provision of a retrieving device of compact type which can be placed beneath a structure employed by the dentist for holding parts of his equipment.

A further object of the invention is the provision of a retrieving device composed of parts which permit quick adjustment and replacement of parts without a total disassembly of the structure.

A further object is the provision of a retrieving device which can hold a dentist's hose out of the operation region but ready for immediate use, which permits a partial withdrawal for convenient removal of a hose attachment for sterilizing or for its replacement with automatic retrieval thereafter, which permits the withdrawal of the hose to bring the attachment to the operation region and to hold the hose without retrieving tension thereon but permitting farther withdrawal for example in response to the patient's movement, and which effects a quick automatic retrieving when the hose attachment is no longer needed.

With these and other objects in view, as will appear in the course of the following description and claims, an illustrative embodiment of the invention is shown in the acompanying drawings, in which:

FIGURE 1 is an elevation of a dentist's stand having a cuspidor arm with hose retrieving devices associated therewith according to this invention ;

FIGURE 2 is an upright sectional view, at a larger scale, of the cuspidor and retriever devices, substantially on broken line 2—2 of FIGURE 3, with part of the cuspidor broken away and the retriever devices in elevation;

FIGURE 5 is a top view of the upper retriever device substantially on line 5—5 of FIGURE 2;

FIGURE 5a is an enlarged fragmentary section substantially on line 5a—5a of FIG. 5.

FIGURE 6 is a section substantially on line 6—6 of FIGURE 5, showing one of a plurality of the retrieving spring capsules in elevation;

FIGURE 7 is a horizontal section, substantially on line 7—7 of FIGURE 6;

FIGURE 8 is an upright section of a hose roller on the retrieving plate, substantially on line 8—8 of FIGURE 7;

FIGURE 9 is a horizontal section, substantially on line 9—9 of FIGURE 6, with the retrieving plate in the retrieved position;

FIGURE 14 is an end view of a spring capsule assembly;

FIGURE 15 is a section of the same, substantially on line 15—15 of FIGURE 14;

FIGURE 16 is a detail section corresponding to part of FIGURE 15, on a greatly enlarged scale.

Figure 3:
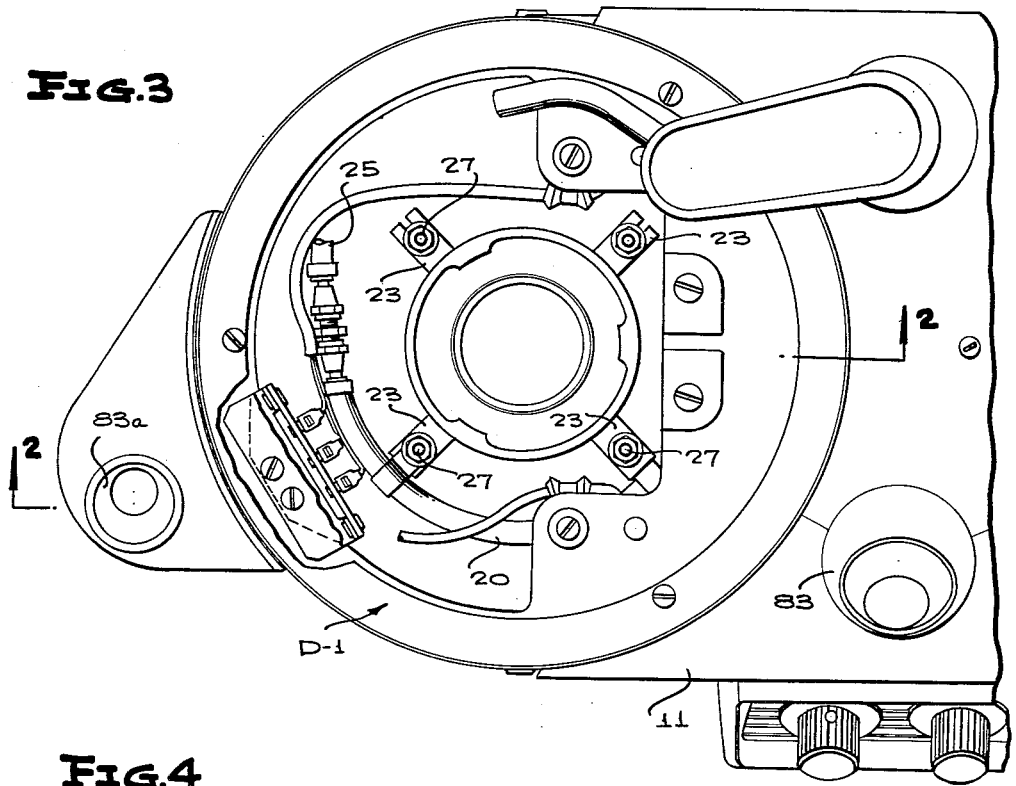
FIGURE 3 is a top view substantially on broken line 3—3 of FIGURE 2, with the cuspidor and nozzle pieces removed.

In FIGURE 1, a floor supported stand 10 has an arm 11 which can be swung about the vertical axis of the stand, from a position for easy access by the patient to one at which the assistant can work closer to the chair (not shown) without impedance. This arm 11 is shown as having the cuspidor 12 thereon. The stand 10 is shown with the usual inter-pivoted arms 13 for the driving belts leading from a dental engine to the handpiece 14. A swinging tray arm 15 supports a tray 16: and retriever devices 17 may be provided below the tray for a warm water syringe, and like equipment.

Beneath the arm 11, as shown in FIGURE 2, are two independently operating retriever devices D-1 and D-2; with the upper device D-1 cooperating with a hose 20 leading to a water syringe, air instrument, or other spray device 18, and the lower device D-2 cooperating with a hose 20a leading, e.g., to a saliva ejector 19. The devices D-1, D-2 are essentially identical and are coaxially mounted about the cuspidor trap. Only the upper device will be hereinafter described in detail, to avoid repetition.

Each device has a cup-like housing or casing 21, these cups abutting at their edges, FIGURE 2. The upper cup has upstanding lugs 22 which are attached inside the arm 11 and thus prevent relative rotation of the upper cup. The U-shaped clip pieces 23 (FIG. 5a) embrace the outer ends of the two cups and are connected to each for maintaining the assembly and to hold the lower cup against rotation relative to the arm 11: with the central parts of each clip extending (FIGURE 5) through the central holes 24 of the cups.

Figure 4:
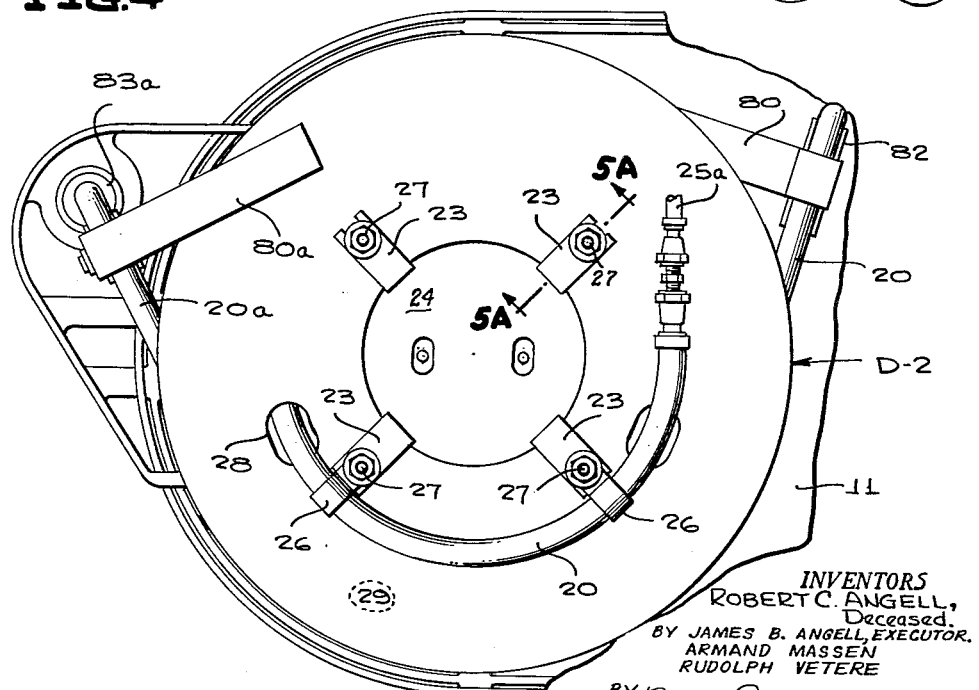
FIGURE 4 is a bottom view, substantially on line 4—4 of FIGURE 2.
Figure 10:
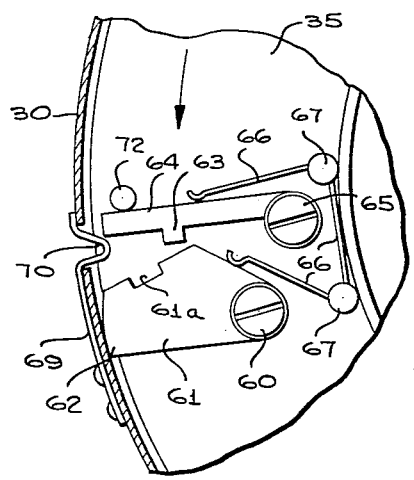
FIGURE 10 is a fragment of FIGURE 9, with the plate and its detent parts in a different position representing an early stage of hose withdrawal.
Figure 11:
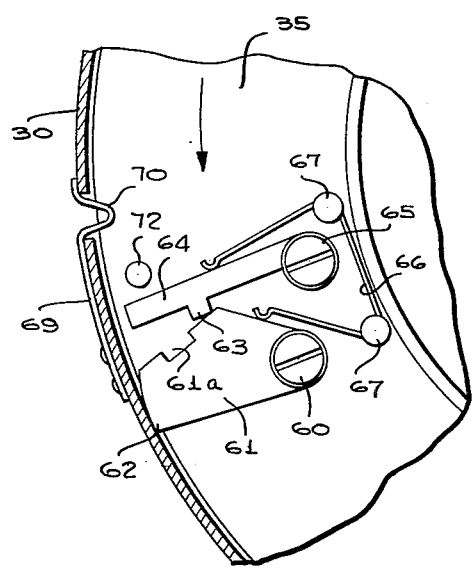
FIGURE 11 is a similar fragment, with the parts in a position of hose detention in the absence of a pull along the hose.
Figure 12:
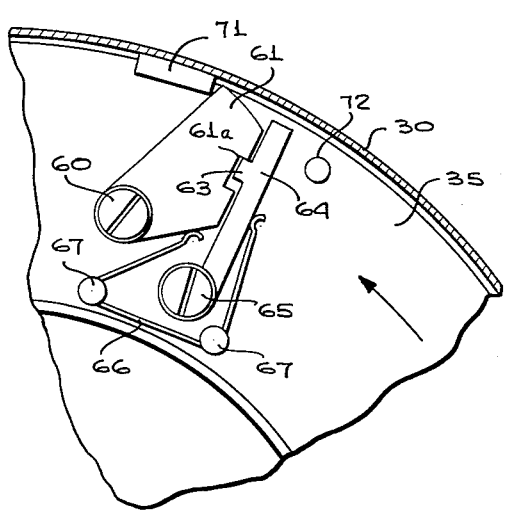
FIGURE 12 is a similar fragment, with the parts in a position of detent resetting for hose return.
Figure 13:
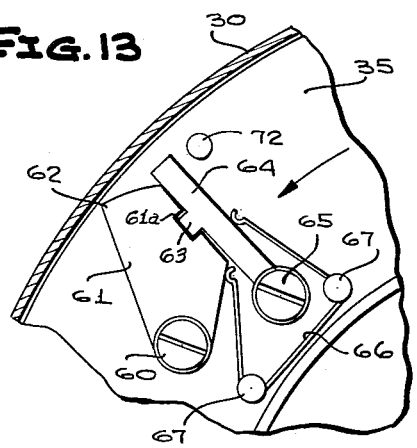
FIGURE 13 is a similar fragment, with the parts in a position of automatic hose return.

The respective hoses 20, 20a, FIGURES 3 and 4, are connected to service lines 25, 25a in the arm 11 at their inner and fixed ends; and are held to the fixed cups 21 of their respective retrieving devices D-1 and D-2 by clips 26, nothing that the same screws 27 which hold the cup-joining clip 23 can serve for the hose clips. Each hose passes through an opening 28 in the end wall 29 (FIGURE 5) of the respective cups 21. Each cup 21 has a skirt wall 30 (FIGURES 6, 7, 9–13), which has an opening 31 through which the respective hose 20, 20a may emerge and be connected to the respective parts 18, 19.

As shown in FIGURE 7 for the upper device D–1, the hose 20 extends within the cup-like casing and lies against the peripheral wall 32 of a spring capsule more fully described hereinafter, for a major part of the circumference; then around a turning roller 33, thence extending outward and reversing its direction and then extending again around the wall 32 but held spaced therefrom and from its own inner portion of the guide rollers 36, of which five are illustrated with spacings at 60 degrees from the roller 33 and from one another, these rollers 33, 36 having pivot bearings 37 on a rotatable plate 35 (FIGURE 8). The hose then extends outward through the hole 31 in the peripheral wall of the casing.

The spring capsule, FIGURES 14–16, has the peripheral wall 32 formed integrally with the radially extending annular flange 39 which has the screws 27 fixed therein. These screws project, FIGURE 6, through the annular flange 39 and the cup flange 29, and nuts 41 can fix the parts 29, 39 together as well as the clips 23, 26. The inner periphery of the flange 39, FIGURES 15 and 16, has an axial extension 43 formed with a race channel 44 facing away from the common axis, for receiving a plurality of bearing balls 45 which are also located in a like but inwardly facing channel 46 formed on an integral axial flange of the rotatable annular disk 47 of the capsule assembly. A cage 48, FIGURE 16, can be employed for maintaining the peripheral spacing of the balls 45. The disk 47 has screws 49 fixed therein, to extend through arcuate apertures 50 of the plate 35, FIGURES 6 and 9, so that the disk 47 can be fixed to this plate by the nuts 51. A spiral spring 53 is located between the flange 39 and the disk 47, being enclosed by the peripheral wall 32 and the flange projection 46. The outer end of the spring can be apertured to receive the stud 54 secured in the wall 32: and its inner end illustratively has a curl 55 to fit around the stud pin 56 fixed in the disk 47.

The members 39, 47 can be made of resilient material, such as spring steel: therewith the assembly of these parts with the antifriction balls 45 can be accomplished by pressing the parts together, and thereupon the antifriction members act to prevent accidental separation of the parts and a specific connecting device is not needed. The capsule so constructed permits the use of a spiral spring for producing essentially constant torque over the course of a relative revolution of the members 39, 47; e.g., by forming a spiral spring with its curl 55 at the outer end and then reversely coiling to the working position shown. Such a spring may be made with six turns in relaxed condition, from a spring tape stock ¼ inch wide and 0.032 inch thick, and has been found to exert a satisfactory and not excessive retrieving tension upon a hose and its attachment.

It will be noted that the assembled structure has an aperture at its center, so that the cuspidor trap, or a like part, can extend therethrough and be seated independently upon the arm 11.

A detaining device is provided for each plate 35. Being identical in parts and operation, only one will be described, in conjunction with FIGURES 9–13. The plate 35 has a pivot 60 for a detent dog 61 whose toe 62 can engage the peripheral wall 30 of the casing cup and prevent clockwise, FIGURES 9–13, movement of the plate 35 relative to the casing while permitting counterclockwise movement. This dog 61 has a notch or recess 61a at its edge for receiving a lug 63 on a latch finger 64 which has a pivot 65 on the plate 35 at a point spaced from the pivot 60. A composite torsion leaf spring 66 is supported on the pins 67 fixed to plate 35 and by its ends urges the dog 61 and the control finger 64 counterclockwise about their respective pivots. A guide bar 68 is fixed to plate 35 and extends over the dog and finger to prevent excessive movement away from the plate 35. A spring 69 is secured to the casing wall 30 and has a hump 70 projecting through the wall into the path of the dog and finger. A stop piece 71 is secured inside the casing, to limit the rotative movements of the plate 35. A pin 72 on the plate 35 limits the relative movement of the latch finger 64 away from the detent dog 61.

When the hose 20 is pulled out, as by tension upon the attachment at its outer end, the hose acts at the turning roll 33 to cause the plate 35 to move clockwise in FIGURE 7 and counterclockwise in FIGURES 9–13. The lug 63 for a time remains in the recess 61a of the dog 61, and the dog 61 remains free of the inner surface of the casing wall 30. As the hose turns about the roller 33, each angular increment of movement of the plate 35 results in delivery of a length of hose corresponding to twice this angle: so that with a casing 9½ inches in diameter, about 40 inches of hose can be withdrawn with less than a full revolution of the plate 35. During the course of withdrawal, the dog 61 encounters the hump 70, and can swing clockwise about its pivot 60 but without being released, because the lug 63 can slide relatively outward along the recess 61a, and noting that the hump 70 can move outward by camming effect of the dog 61. When the dog 61 has passed the hump 70, the finger 64 encounters the hump (FIGURE 10) and is momentarily detained, so that the lug 63 is withdrawn from the recess 61a and the dog 61 is moved counterclockwise by the spring 66 into engagement with the wall 30. When the finger 64 leaves the hump 70, its lug 63 comes against the side of the dog 61 (FIGURE 11) outside the recess 61a and the dog 61 continues to act for preventing clockwise movement of the plate 35 while allowing counterclockwise movement. If the withdrawal is stopped at, say, 20 to 25 inches of hose, the action of the spring 53 is to urge the plate 35 in clockwise or retrieving direction, but the dog 61 engages the wall 30 and prevents such return: that is, the hose is not retracted, but is ready for farther withdrawal. When it is desired to retrieve the hose into the casing, it is drawn fully out, FIGURE 12, until the dog 61 comes against the stop piece 71, and is detained thereby and swings on its pivot against the action of its spring 66 and rocks the control finger 64 so that the lug 63 slides relatively along the edge of the dog 61 and drops into recess 61a under the action of spring 66 upon the control finger 64, engaging the radially inward end wall of the recess and becoming effective for holding the dog 61 away from the wall 30. When the tension upon the hose is then relaxed, the plate 35 is turned by the spring 53 and its roller 33 draws the hose back into the casing. During the course of this return or retrieving movement of the plate 35 and the parts thereon, the dog 61 is held free (FIGURE 13) of the wall 30. The hump 70 is pressed outward by the finger 64, and then return for engagement and like outward movement by the dog toe 62 but without ability to restore the dog 61 to engagement with wall 30 because of the continued presence of the lug 63 in recess 61a. Finally, the finger 64 comes against the stop 71, FIGURE 9, at the side opposite that which was engaged by the dog 61 when the hose was fully withdrawn, and the movement of plate 35 is stopped. During the next withdrawal of hose, the dog and finger are still interlocked by the lug annd recess wall: so that the hose can be drawn out a short distance, and then permitted to return without detention by the dog: e.g., to permit removal of the syringe attachment for sterilization and its replacement by another piece. When the withdrawal is through a greater arc, determined by the angular spacing along the wall 30 of the stop 71 from the hump 70, the dog 61 and then the finger 64 engage the hump and can rock backward, as set out above, and the dog 61 is positioned to prevent rewinding.

The tension in the spring 53 can be adjusted, FIGURES 6 and 9, by loosening the nuts 51 and shifting the plate 35 relative to the end wall 29 of the spring capsule, and re-tightening the nuts.

The cups of the respective units D–1, D–2 are shown (FIGURES 2 and 4) as having their end walls 29 provided with projecting arms 80, 80a, with upstanding spaced ends 81 for receiving the external guide rollers 82 by which the direction of the respective hose is turned upward. Thus, the arm 11 may be provided with reception pieces 83, 83a with upwardly directed openings for the respective hoses and capable of holding the tools 18, 19 when fully retracted.

The illustrative form is not restrictive, and the invention may be employed in many ways within the scope of the appended claims.

What is claimed is:

1. A retrieving apparatus for a flexible linear article, comprising a support, a member rotatable on said support having means for holding the article to be withdrawn and retrieved, a spring for causing the member to turn relative to the support for retrieving the article, a detent for preventing retrieving motion of the member, a latch for directly engaging and positively holding the detent out of its preventing position, means positioned to be effective at an intermediate rotated position of the member for actuating the latch to disengage it from the detent so that upon a further withdrawing movement the retrieving motion of said member is prevented, and means positioned to be effective upon a completed withdrawal of the article to effect movement of the detent and the engagement of the latch therewith whereby the spring will produce retrieving of the article.

2. A retrieving apparatus for a flexible linear article, comprising a support having a first circular flange, a member rotatable relative to the support and having a second circular flange spaced radially from said first flange, a turning roller carried on said member and located in the space between said flanges whereby the article in withdrawn position may lie along the outer surface of said second flange and around said roller and then extend from said roller in reverse direction in said space and thence away from the member, spring means acting between the support and member to urge the member to retrieve the article, a detent pivoted on the member and engageable with the first flange for preventing retrieving motion of said member, a latch on the member for holding the detent out of engagement with the first flange, first stop means on the support effective at the end of retrieving motion of the member to stop the said member while holding the latch engaged with the detent, yielding means on the support peripherally spaced from the first stop means for releasing the latch from the detent during withdrawal of the article, second stop means on the support effective at the end of withdrawal motion for engaging the latch with the detent whereby the member is urged by the spring to retrieve the article.

3. A retrieving apparatus for a flexible linear article, comprising a cup-shaped casing having a first circular flange at its outer periphery with an opening in said flange, a second flange secured to the casing in radially spaced relation to said first flange, a member rotatable relative to the casing and having rollers journaled thereon and located in the space between said flanges, spring means for urging the member to rotate relative to the casing for retrieving the article, the article when in retrieved position extending through an end wall of the casing into said space and thence along the outer surface of the second flange and around one of said rollers and thence in reverse direction in said space and at the outer sides of said rollers and passing through the same flange opening, a detent pivoted on the member and engageable with the first flange for preventing retrieving motion while permitting withdrawing motion of the member, a latch pivoted on the member for holding the detent out of its preventing position whereby the member is free to move in either withdrawing or retrieving direction, means for limiting the retrieving movement of the member, first means on the first flange for engagement with the detent during the withdrawing motion of the member and thereby effecting disengagement of the latch therefrom, and second means on the first flange for engagement with the latch and peripherally spaced from said first means for actuating the latch and releasing the detent to preventing position after the member has performed a partial withdrawal movement.

4. A retrieving apparatus for a flexible linear article comprising a casing having a peripheral first flange; a spring capsule having a first part secured to the casing and having a second flange concentric with and radially spaced from the first flange, a second part and bearing means between said parts whereby the second part can turn about the axis of the flanges, and a spring connected to said parts for causing the second part to turn; means within the space for controlling the article while being retrieved, said means being connected to said second part and including a detent engageable with said first flange to prevent retrieving motion between said flanges, and means on said casing for controlling engagement and disengagement of the said detent with said flange.

5. An apparatus as in claim 4, in which the second part has studs thereon projecting through arcuate slots in said member, and means for fixing said studs at selected points along the lengths of said slots whereby to determine the torque exerted by the spring for turning said second part.

6. A retrieving apparatus for a flexible linear article, comprising a casing having an annular end and a peripheral first flange; a spring capsule having a first annular part with a peripheral skirt and secured to the first flange, a second annular part, said parts having opposed peripheral race portions located within said skirt, antifriction means in said races, and a spiral spring connected to said parts and located between the race portions and the skirt; an annular plate connected to said second part, article controlling means mounted on said annular plate and located between said first flange and said skirt, said article controlling means including latchable detent means for engaging said first flange and thereby detaining said article against movement in one direction, and means on the first flange for effecting latching and release of said detent means; said flange, parts, race portions and plate being concentric whereby the spring urges the plate and second part to turn about the common axis relative to said casing, and whereby a central axial space is present through the casing, capsule, and plate.

7. A retrieving apparatus for dental hose, comprising a casing having an end and a peripheral first flange, upstanding members on said end for connection to a dentist's stand, said end and first flange having apertures, clips secured to the outer surface of said end for holding a part of the hose fixedly to said casing with the hose passing through the aperture in said end, a plate rotatable within said flange, a second flange radially equi-spaced from the first flange and secured to said casing, rollers carried on the plate eccentrically to the axis of plate rotation within the space between the flanges, the hose when withdrawn being positioned to extend from said end aperture along the outer surface of the second flange and thence around one said roller and thence in the reverse direction in said space and outside the other rollers and through the flange aperture, means providing a bearing between said second flange and said plate for rotation of the plate about the common axis of said flanges, a spring connected between said casing and plate for urging the plate to turn in the retrieving direction, a detent carried by the plate for engaging said first flange to prevent retrieving movement, and means on the casing for moving the latch to non-preventing position when the hose has been withdrawn.

8. An apparatus as in claim 7; in which the casing has projecting support means with a roller mounted thereon, for deflecting the hose as it issues from the flange aperture from movement in a radial plane relative to said common axis to movement at an angle thereto.

9. An apparatus as in claim 8 for two hose lengths, including two said casings, plates and springs, the casings having open ends mounted with said first flanges in abutment and with the flange apertures peripherally spaced from one another, and securing members holding said casings together and passing through the openings in the casing ends at points inward of said second flanges of the casings.

References Cited in the file of this patent

UNITED STATES PATENTS

| | | |
|---|---|---|
| Re. 18,460 | Pieper | May 10, 1932 |
| 1,048,758 | Sultemeyer | Dec. 31, 1912 |
| 2,270,283 | Ewald | Jan. 20, 1942 |
| 2,375,917 | Gross | May 15, 1945 |
| 2,391,840 | Meletti | Dec. 25, 1945 |
| 2,506,583 | Duerr | May 9, 1950 |
| 3,049,317 | Kessler | Aug. 14, 1962 |